P. L. FORTIN.
MANURE SPREADER FOR WAGONS.
APPLICATION FILED MAY 21, 1909.
971,836.
Patented Oct. 4, 1910.
3 SHEETS—SHEET 1.
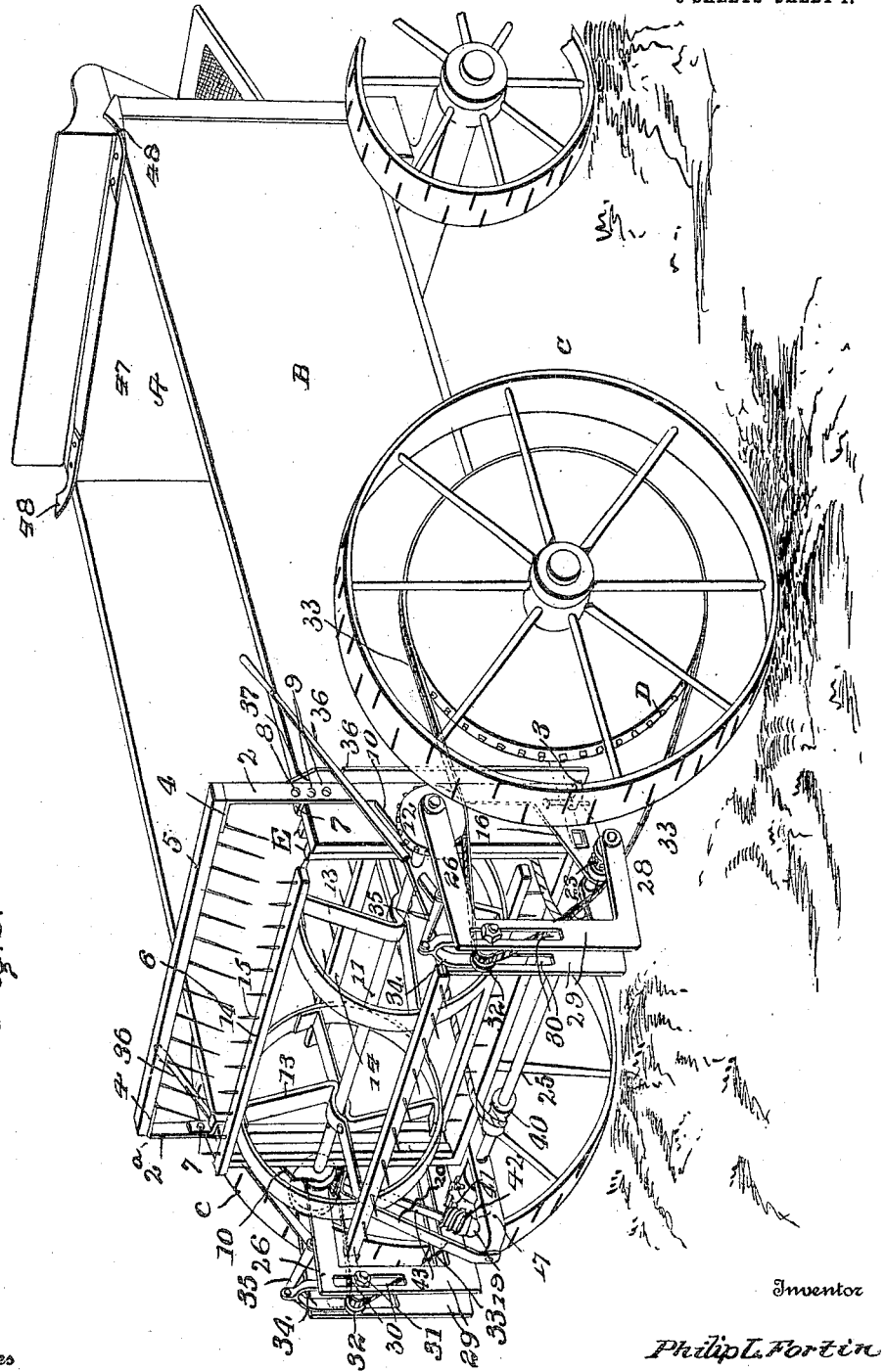

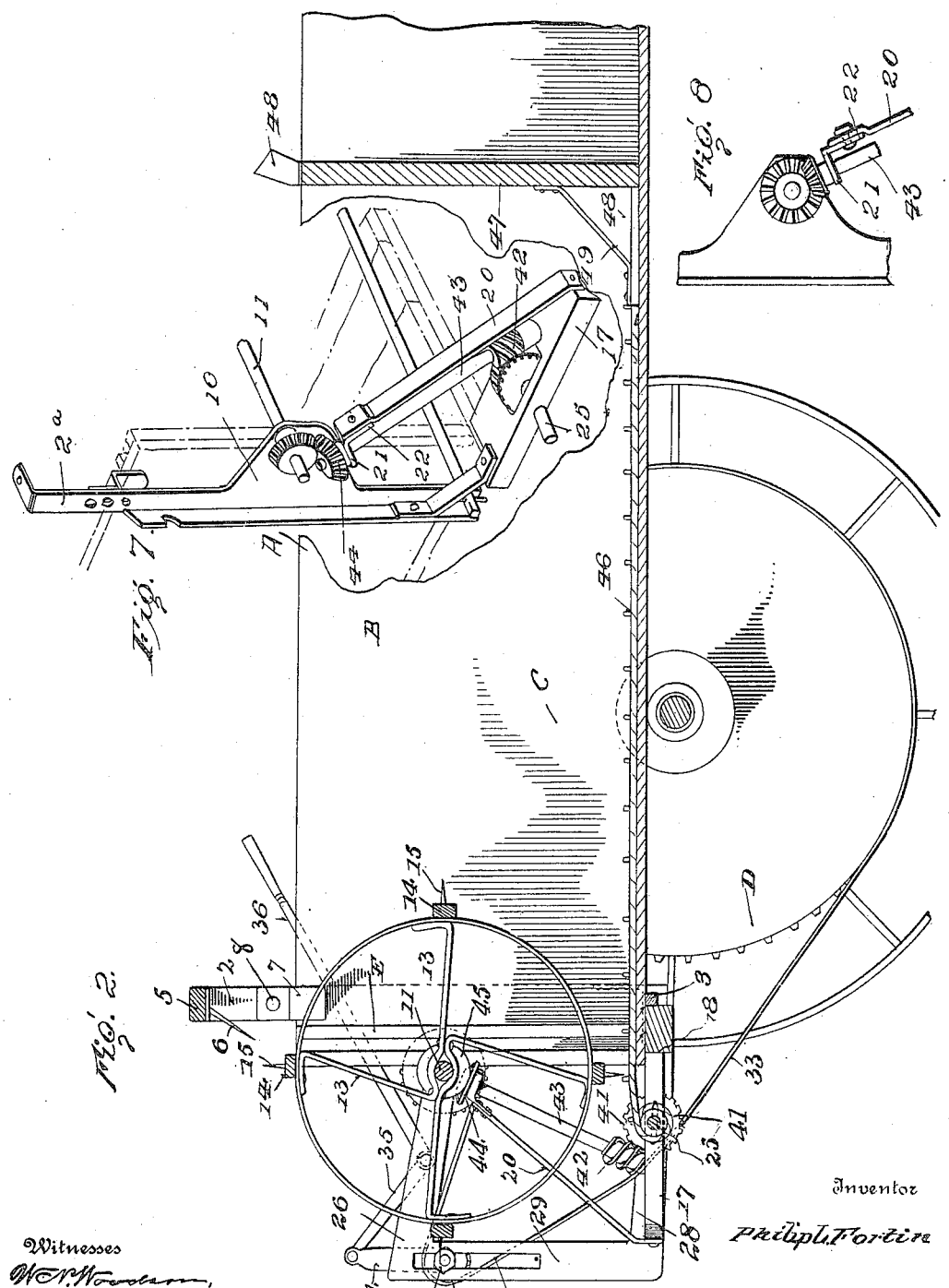

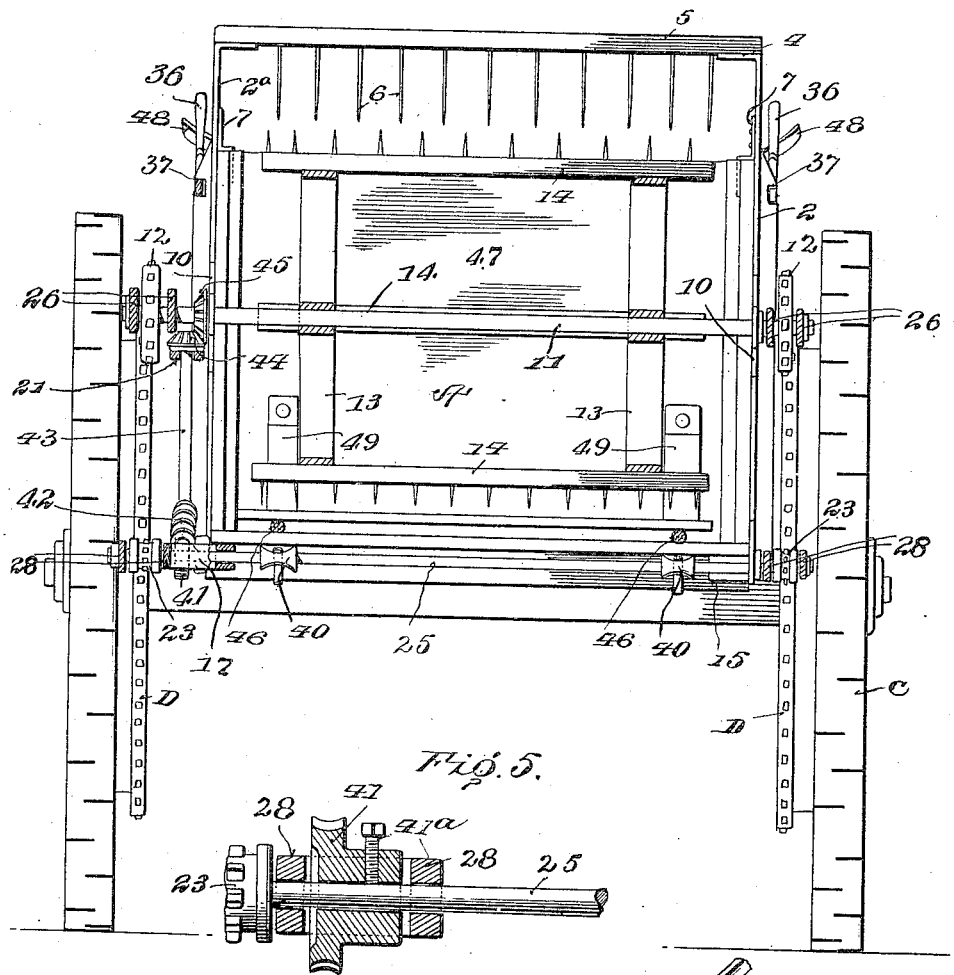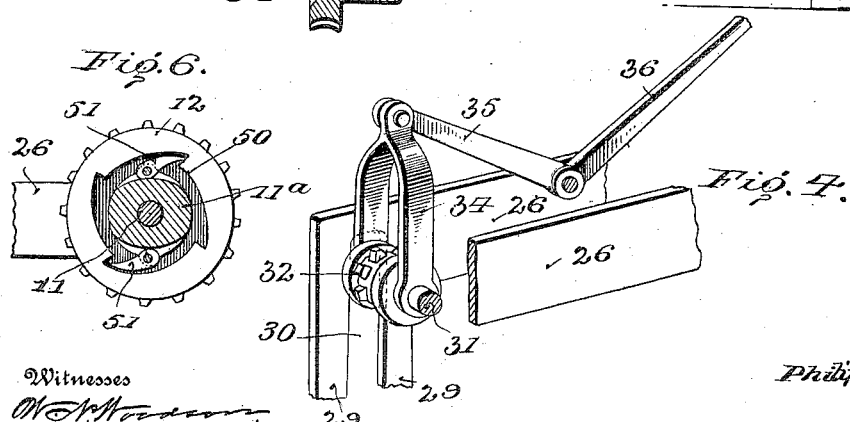

UNITED STATES PATENT OFFICE.

PHILIP L. FORTIN, OF CLYDE, KANSAS.

MANURE-SPREADER FOR WAGONS.

971,836. Specification of Letters Patent. Patented Oct. 4, 1910.

Application filed May 21, 1909. Serial No. 497,395.

*To all whom it may concern:*

Be it known that I, PHILIP L. FORTIN, a citizen of the United States, residing at Clyde, in the county of Cloud and State of Kansas, have invented certain new and useful Improvements in Manure-Spreaders for Wagons, of which the following is a specification.

My invention relates to manure spreaders, and particularly to spreaders of that type wherein a frame is employed, adapted to be attached to the rear end of any ordinary wagon box, this frame supporting the circular or cylindrical spreader rake which acts to distribute the manure in an even amount from the rear of the wagon. In connection with the cylindrical rake or spreader, I employ a feed board which is mounted within the wagon box and is connected by a cable to a winding shaft or roller mounted on the frame and revolved when the distributing cylinder is revolved, these parts being connected by sprocket chains to sprocket sections on the traction wheels of the wagon, so that as the wagon moves forward, the distributing rake will be revolved and the feed board will be drawn rearward. In this connection, I also provide means for disconnecting the rake-actuating shaft and the delivery board-actuating shaft from engagement with the traction wheels of the wagon, so as to stop the delivery of the material, and further to provide means whereby, when the delivery board has reached its rearmost position, it will automatically disconnect the delivery rake and winding shaft from engagement with the traction wheels. My invention relates not only to the general construction of a manure spreader of this type, but also to certain specific details in the formation of the frame by which the spreading mechanism is detachably attached to the rear end of the wagon.

For a full understanding of the invention and the merits thereof, and to acquire a knowledge of the details of construction, reference is to be had to the following description and accompanying drawings, in which:

Figure 1 is a perspective view of a wagon with my spreader attached; Fig. 2 is a longitudinal vertical section thereof; Fig. 3 is an end view partly in section; Fig. 4 is a detail perspective view of one of the shiftable sprockets; Fig. 5 is a detail section of the worm gear; and, Fig. 6 is a detail view of the pawl and ratchet connection between the main shaft and a sprocket wheel. Fig. 7 is a fragmentary perspective view showing one of the supports for the mechanism. Fig. 8 is a detail perspective view of the same.

Corresponding and like parts are referred to in the following description and indicated in all the views of the drawings by the same reference characters.

Referring to the drawings, A designates a wagon box of any usual construction, having the opposed side boards B and the rear traction wheels C, these traction wheels having upon them the sprocket sections D. These parts form no portion of my invention. In order to mount my spreader upon the wagon box, I provide a rectangular frame consisting of side pieces 2, preferably of angle iron, as shown, and long enough to extend from a point slightly below the bottom of the wagon, to a point above the top edge of the side boards. The lower ends of these side pieces are connected by a transverse rod 3 provided with any suitable means whereby it may be tightened beneath the body of the wagon. The upper ends of the side pieces 2, 2ª are inwardly bent or angled, as at 4, for attachment to a cross bar 5 having thereon the downwardly projecting rake teeth 6. The inner face of each side piece has attached to it an angularly bent lug 7. A bolt 8 connects each lug to its adjacent side piece, and a plurality of bolt holes 9 are formed in the side pieces, in vertical alinement, so that the lugs 7 may be adjusted upon the side pieces as shown in Fig. 1. This angular lug 7 is adapted to engage over the upper edge of the side boards of the wagon body, just forward of the slides E for the tail board. The connection which I have described will hold the frame securely in place, its rearward motion being prevented by the lugs 7 contacting with the slides E, while any forward movement of the frame is prevented by the shaft which carries the rotary distributing rake, as will be later shown. The rear edges of both of the side pieces 2, 2ª are provided with the projecting ears 10 having at their ends the bearings for a transverse shaft 11, this shaft being of such length that it extends at both ends beyond the ears 10. The sprocket wheels 12 are attached to the ends of the shaft, and the rotary rake or distributer is rigidly attached to the middle of the shaft so that a vertical plane cutting the axis of the rake will be coincident with the rear end of the wagon. This rake preferably consists of opposed skeleton wheels having the spokes 13. These spokes are four in number and are composed of two sheet metal strips which are bent approximately in the form of a V, the legs extending out to the periphery of the wheel and attached to the rim thereof. The strips at their centers are attached to each other, as shown, and surround the shaft 11. I do not wish to limit myself to this construction of the wheels, but regard it as a very simple and cheap construction and one entirely effective for the purpose. Transverse bars 14 are attached to the rims, these bars being provided with projecting rake teeth 15 which alternate in position with the rake teeth 6.

The lower end of the side piece 2 is provided with the rearwardly projecting ear 16. The side piece 2ᵃ has attached to it the rearwardly projecting member 17. This member 17 is slotted, as at 19, to accommodate and support a worm gear shaft 43, as will be later described. The rear end of the member 17 is supported by a strap 20 which extends upward toward the shaft 11 and is attached to the ear 10 projecting from the side piece 2ᵃ. This ear 10, as will be seen from Figs. 7 and 8, has a laterally projecting lug 21 whose rear margin has a downwardly bent portion 22 to which the upper end of the strap 20 is riveted. This laterally projecting lug 21 forms a support for a bevel gear wheel 44 which is attached to the worm gear shaft 43. Passing through the member 17 and through the ear 16 on the side piece 2 and supported therein, is the transverse winding shaft 25, this shaft intersecting the slot 19 in the member 17, which shaft carries the gear wheel 41 intermeshing with the worm 42 on the shaft 43. The extremities of the shaft 25 also carry the loose sprocket rollers 23. On each side of these sprocket rollers 23 and projecting rearwardly from the shaft 25 are the arms 28, while on each side of the sprocket wheels 12 are the rearwardly projecting supporting arms 26 corresponding to the arms 28, these arms 26 and 28 being connected by the vertical bars 29. The arms 26 and 28 and the vertical bars 29 are preferably formed integral with each other. It will be seen that there are two pairs of these arms 26 and 28 and vertical bars 29. The bars 29 are longitudinally slotted, as at 30, for the support and guidance of transverse short shafts 31 upon each of which is mounted a freely rotatable sprocket roller 32, these rollers 32 supporting the rearmost portion of the sprocket chains 33, which pass from the rollers 32 forward and around the sprocket sections D on the traction wheels, the lower stretch of the chains 33 engaging with the freely moving rollers 23. Yokes 34 support the transverse shafts 31 and these yokes at their upper ends are connected to bell crank levers 35 whose other arms are prolonged, as at 36, so that when the arms 26 are moved forward they shall engage under hooks 37 formed in the side frames 2 and 2ᵃ. The arms 36 are sufficiently long that they project beyond the hooks and extend to a point adjacent to and slightly above the upper edge of the side wall of the wagon. It will be seen in Fig. 1 that the sprocket chains on both sides of the wagon pass around the sprocket sections on the traction wheels, pass rearwardly beneath the sprockets 12 on the shaft 11, then pass over the freely moving sprocket rollers on the shafts 31, and then pass down and engage with the freely moving sprocket rollers on the shaft 25. When these sprocket chains are slack, that is, when the yokes 34 are depressed, then the upper stretch of the sprocket chains will not engage with the sprocket wheels 12, but when the bell cranks 35 and 36 are moved so as to elevate the sprocket wheels 32, then the sprocket chains 33 will be tightened and engaged with the shaft 11 through the sprocket wheels 12, and the rotary rake will be operated.

The winding shaft 25 may have thereon winding rollers 40 engaging with the cable of the traveling feed board. In order to drive this shaft 25, I mount upon it the toothed gear 41 which engages with a worm gear 42 carried on the end of an upwardly and forwardly extending shaft 43. The upper end of this shaft extends through the lug 21 and has a bearing therein and is provided at its extremity with the bevel gear wheel 44 which engages with a bevel gear 45 on the shaft 11 interior of the sprocket wheel 12. It will therefore be seen that a rotation of the shaft 11 will cause a relatively slow rotation of the shaft 25.

Attached to the winding shaft 25 or the winding roller thereon, are the forwardly extending cables 46 (see Fig. 2) which at their rear ends are attached to a vertical delivery board 47, this delivery board being held braced by a base frame 48 and diagonal braces 49. It will be obvious that as the shaft 25 is rotated, the cables 46 will be wound thereupon and the delivery board 47 will be drawn toward the rear end of the wagon, this movement, however, being comparatively slow. The upper edge of the delivery board 47 is provided with the outwardly and upwardly extending wings 48 which extend out sufficiently far so that during the last of the movement of the board 47, the wings will engage with the upwardly extending ends 36 of the bell crank levers 35, when these levers are engaged with the hooks 37 on the sides of the side pieces 2, that is, when the sprocket chains 33 are under tension. When this engagement takes place, the bell crank levers will be disengaged from the hooks, and the sprocket wheels 32 will fall, thus moving the sprocket chains 33 downward from engagement with the sprocket wheels 12, thus stopping the movement of the distributing wheel and at the same time of course stopping the movement of the transverse shaft 25, and therefore the delivery of the manure. In order to provide means for disconnecting the shaft 25 from its driving worm gear, in order to reverse the movement of the delivery board and replace it in its original position, I attach the gear wheel 41 to the shaft 25 by a set screw 41ª. When this set screw is forced in, the gear wheel 41 is in engagement with the shaft and rotates with it, but otherwise the gear wheel 41 is loose on the shaft, thereby permitting the reverse rotation of the shaft 25 and the unwinding of the cables 46 from the shaft. This is shown in Fig. 5.

It is to be particularly noted that the sprocket wheels 32 are independent of each other, and therefore that one of the sprocket chains may be tightened up to engage the sprocket wheels 12 without affecting the other, or that it is easy to adjust one sprocket wheel so that it may be raised slightly higher than the other in order to tighten chains which have a difference in length. It is of course necessary to provide means for preventing the backward movement of the wagon from reversely actuating the distributer and the winding shaft, and it is also necessary to provide means whereby when the wagon is turning, the main shaft shall be actuated by the outside wheel of the wagon. To this end, as shown in Fig. 6, I form the sprocket wheels 12 with internal recesses 50, these recesses being ratchet-toothed. Attached to the ends of the shaft 11 are hubs 11ª which are provided with pawls 51 engaging with the internal ratchet teeth in the recesses 50 upon a movement of the sprocket wheels in one direction, but permitting the sprocket wheels to slip on the shaft when they are moved in the opposite direction. Thus, it is obvious that when turning, one of the traction wheels will move at a higher rate of speed than the other traction wheel. Under these circumstances, the outer sprocket chain will rotate the shaft, while the inner sprocket wheel will slip around the shaft. This is an important feature of my invention, and I believe it to be of particular value.

The operation of my invention is obvious from what has been described. When it is desired that the material in the wagon shall be distributed, the bell crank arms 36 are moved forward and engage with the hooks 37. This places the sprocket chains under tension, and thus tightened, the sprocket chains rotate the shaft 11, rotating the rotary rake and the winding shaft 25. The material is thus slowly delivered, to the rotating rake which throws it from the wagon and distributes it as best needed. In order to replace the delivering board, after the material has been delivered from the wagon, it is only necessary to disengage the shaft 25 from its actuating gear 41 by loosening the set screw 41ª, whereupon the shaft may be freely rotated and the conveyer cable be drawn off the shaft. The distributing board may be moved to its position in the forward end of the wagon either by hand or by any suitable mechanism.

The advantages of my invention reside in the simplicity of its construction and the fact that it can be readily attached to the rear end of any ordinary wagon body. It will be seen that it is composed of elements that may be easily procured in the country, and that there are no complicated parts to put on, which are likely to be broken in use.

While I believe that the embodiment of my device here shown and described is the preferable form, I do not wish to be limited to these exact details, as it is obvious that minor modifications might be made without departing from the spirit of the invention.

Having described my invention, what I claim is:

1. In a distributing mechanism of the character described, a wagon body, traction wheels, a conveyer movable along the bottom of the body from the front toward the rear thereof, a beater shaft having a sprocket wheel thereon, a winding shaft operatively connected to the beater shaft to rotate therewith, a vertically movable freely rotatable sprocket roller rearward of the beater shaft, a sprocket chain passing over said roller and normally engaging with the sprocket wheel on the beater shaft when the sprocket roller is in its uppermost position, and means for moving the sprocket roller downward to disengage the sprocket chain from the sprocket wheel on the beater shaft, said means being actuated when the forward end of the conveyer has reached the rear end of the wagon body.

2. In a distributing mechanism of the class described, a wagon body, traction wheels thereupon, driving sprocket wheels carried by the traction wheels, a main shaft mounted rearward of the wagon body and having a sprocket wheel thereon, a vertically movable, freely rotatable sprocket roller rearward of the main shaft, a sprocket chain passing over the traction sprocket wheel and over the loose sprocket roller, a lever engaging the sprocket roller to hold it in a raised position with the sprocket chain in engagement with the sprocket wheel of the main shaft, said lever extending upward above the sides of the wagon body, a distributing board carried in the wagon body and having portions projecting outward above the wagon body adapted to engage with the lever when the distributing board has reached its rearmost position, and means operated by the main shaft for moving said distributing board from the front to the rear of the wagon body.

3. The combination with a wagon body, of frames projecting on either side from the rear end thereof, a rotatable shaft mounted in said frames, a rotatable distributing wheel on the shaft, sprocket wheels on the extremities of the shaft, traction wheels on the wagon body provided with sprocket sections, sprocket chains extending rearwardly from said sprocket sections, vertically shiftable sprocket wheels supported in said rearwardly projecting frames over which said sprocket chains pass and by which the upper stretch of said chains may be elevated into engagement with the sprocket wheels on the distributer shaft, a delivering mechanism actuated from the distributer shaft, and means on the said mechanism engaging with the shiftable sprocket wheels when the delivering mechanism is at the rearward extreme of its movement to allow the said sprocket wheels to fall to release the engagement between the sprocket chains and the distributer shaft sprocket wheels.

4. The combination with a wagon body having rear traction wheels provided with a sprocket gear, of a frame attachable to a wagon body, a transverse frame mounted in the shaft and carrying distributing wheels extending into the wagon body, sprocket wheels in the extremities of the shaft, side frames projecting to the rear of said sprocket wheels, said frames being vertically slotted, sprocket wheels mounted between said side frames and vertically shiftable in said slots, sprocket chains passing over the traction wheel sprocket gears and over the shiftable sprocket wheels, and bell crank levers one for each of the shiftable sprocket gears, pivoted to said frames whereby the sprocket wheels may be elevated to tighten the sprocket chains and bring them into engagement with the sprocket wheels on the ends of the distributer shaft, hooks on the side frames with which the extended ends of said bell crank levers may engage when the sprocket wheels are raised, and a delivering board shiftable longitudinally through the wagon body, said board having projecting wings at its upper end adapted to engage with said bell crank levers when the board has reached its rearmost position to disengage said levers from the hooks and permit the shiftable sprocket wheels to fall.

5. In a distributing mechanism of the class described, a wagon box, traction wheels on the wagon having sprocket gears attached thereto, detachable side frames mounted on the wagon box at the rear end thereof, a transverse shaft mounted in said frames, a rotatable distributing wheel on the transverse shaft extending into the wagon box, sprocket wheels on the ends of the shaft, a transverse winding shaft mounted in said side frames below the distributing wheels, a worm shaft driven from said distributing wheel shaft and engaging with the winding shaft, a movable delivery board within the wagon box, cables connecting the board with the winding shaft, opposed pairs of supporting U-shaped frames extending outward and supported upon the ends of the distributer and winding shafts, said frames being vertically slotted, sprocket wheels vertically shiftable in the slots, sprocket chains passing over said wheels and around the sprocket gears attached to the traction wheels, yokes pivotally connected to the shafts of said sprocket wheels, bell crank levers pivoted on the opposed frames, one arm engaging with the said yokes and the other arm upwardly extended to form a handle, hooks on the side frames adapted to engage with the arms of the bell crank levers when they are drawn forward to raise the shiftable sprocket gears, and wings on the distributer board adapted to engage with said bell crank levers when the board is in its rearward position to disengage the former from the hooks.

6. A distributing mechanism of the class described, comprising a frame having means for attachment to the side boards of a wagon body, said frame having rearwardly projecting ears, a main shaft mounted in said ears, transverse to the end of the wagon body, a distributing wheel on the shaft, sprocket wheels on the extremities of the shaft, vertically shiftable sprocket wheels mounted rearward of the sprocket wheels on the main shaft, traction wheels supporting the wagon body and provided with sprocket gears, sprocket chains passing over the sprocket gears and around the shiftable sprocket rollers, the upper stretch of said chains engaging with the sprocket chains on the main shaft when the sprocket rollers are raised to a higher point, a conveyer movable longitudinally along the wagon body, means for holding the sprocket rollers raised, and means operated by the conveyer when it has reached its rearmost position, acting to disengage the sprocket rollers and permit them to fall, thereby disengaging the main shaft from the sprocket chain.

7. In a distributing mechanism of the class described, side bars adapted to be engaged with the rear end of a wagon body, said side bars having projecting ears, a transverse main shaft mounted in said ears, a plurality of skeleton wheels mounted on the main shaft and connected by cross bars provided with projecting teeth, sprocket wheels loosely mounted upon the outer extremities of the main shaft, said wheels being recessed on their inside faces and formed with ratchet teeth, hubs on the extremities of the main shaft provided with pawls adapted to engage with the ratchet teeth when the sprocket wheels are rotated in one direction, vertically shiftable sprocket wheels mounted rearwardly of the sprocket wheels on the main shaft, bell crank levers whereby said shiftable sprocket wheels may be raised or lowered, sprocket chains passing over the last-named sprocket gears and adapted to be engaged by sprocket gears upon the traction wheels of a wagon, a winding shaft provided with a toothed gear, a bevel gear on the main shaft, a worm shaft engaging with the winding shaft gear and at its upper end having a bevel gear engaging with the bevel on the main shaft, means whereby the winding shaft may be disconnected from engagement with the worm shaft, and delivering mechanism connected with said winding shaft.

8. A distributing mechanism of the class described having side frames adapted for attachment to a wagon body, a main transverse shaft supported in the side frames, a rotatable rake attached to said shaft, sprocket wheels loosely mounted upon the extremities of the shaft, a pawl and ratchet mechanism connecting the sprocket wheels with the main shaft upon movement of the former in one direction, vertically shiftable sprocket wheels mounted rearward of the main shaft and adapted to carry a sprocket chain into engagement with the sprocket wheels on the main shaft, a winding shaft, mechanism for driving the winding shaft from the main shaft at a slower rate of speed, cables adapted to be wound upon the winding shaft, a delivery board at the end of said cables adapted to be placed within a wagon body, and means for disconnecting the main shaft from its engagement with the driving sprocket chains upon the rearmost movement of the delivery board.

9. The combination with a wagon body having opposed side boards, of a distributing mechanism comprising side bars having means for engagement with the side boards, said side bars at their upper ends being connected by a transverse bar having downwardly projecting rake teeth, rearwardly projecting ears on the side bars, a transverse shaft rotatably supported in said ears, a rotatable rake mounted on the shaft, loose sprocket wheels on the ends of the shaft, a bevel gear mounted on said shaft, projecting members on the lower ends of the side bars, a transverse winding shaft on said members, said shaft at one end being provided with a gear wheel, a worm shaft having a worm at one end engaging with said gear wheel, the other end of said worm shaft carrying a bevel gear in engagement with a bevel gear on the main shaft, opposed pairs of rearwardly projecting frame bars the ends of which are mounted upon the projecting ends of the main and winding shaft, said pairs of bars being vertically slotted, bars mounted for vertical movement in said slots, and connecting each pair of bars, rotatable loose sprocket wheels mounted in said bars, yokes connected to the mountings of the sprocket wheels, bell crank levers pivoted on the frames and connecting the said yokes at one end, hooks with which the other ends of the levers are adapted to engage when the levers are in their rearmost position, sprocket chains passing over said shiftable sprocket wheels and connected to the traction wheels of the wagon, a delivery board mounted within the wagon body for longitudinal movement therealong, cables connected to the lower end of the delivery board and to the winding shaft, and means projecting from the upper edge of the delivery board adapted when the delivery board has been moved to its rearmost position to engage with the bell crank levers to throw them out of engagement with the hooks and disconnect the sprocket chains from engagement with the sprocket wheels.

10. In a delivery mechanism of the class described, a main shaft having a distributing wheel mounted thereon, a delivery conveyer, a winding shaft having engagement with the delivery conveyer to move the same from the front to the rear end of the wagon, a gear wheel on the winding shaft, a worm shaft engaging at one end with said gear wheel and at the other having engagement with the main shaft, a driving sprocket wheel, a sprocket chain thereon, means for holding the sprocket chain in engagement with the sprocket wheel of the main shaft, means for disengaging the sprocket wheel when the delivery mechanism has reached its rearmost position, and means whereby the gear wheel on the winding shaft may be detached therefrom to run loose thereon to permit the winding shaft to be reversely turned and the delivery mechanism to be reversely moved.

In testimony whereof I affix my signature in presence of two witnesses.

PHILIP L. FORTIN. [L. S.]

Witnesses:
F. E. WEYER,
L. E. STIMSON.